United States Patent [19]
Matzka

[11] Patent Number: 5,665,961
[45] Date of Patent: *Sep. 9, 1997

[54] PHOTOELECTRIC SWITCH FOR USE WITH A MACHINE CONTROL CIRCUIT

[75] Inventor: Mark C. Matzka, Rochester Hills, Mich.

[73] Assignee: Break-A-Beam, Inc., Warren, Mich.

[ * ] Notice: The term of this patent shall not extend beyond the expiration date of Pat. No. 5,367,158.

[21] Appl. No.: 329,521

[22] Filed: Oct. 26, 1994

Related U.S. Application Data

[63] Continuation-in-part of Ser. No. 782,420, Oct. 25, 1991, Pat. No. 5,367,158.

[51] Int. Cl.⁶ .................... G01V 8/00; H01J 40/14
[52] U.S. Cl. .............. 250/221; 250/229; 250/214 B; 250/214 SW; 361/189
[58] Field of Search .................. 250/221, 229, 250/239, 214 AL, 214 B, 214 SW, 214 C; 327/524; 340/555, 556; 361/177, 189, 193

[56] References Cited

U.S. PATENT DOCUMENTS

| | | |
|---|---|---|
| 2,174,206 | 9/1939 | Etter . |
| 3,207,957 | 9/1965 | Naylor . |
| 3,242,341 | 3/1966 | Woodward .......................... 250/221 |
| 3,360,654 | 12/1967 | Müller ............................... 250/221 |
| 3,576,277 | 4/1971 | Blackmon . |
| 3,704,396 | 11/1972 | Macdonald . |
| 3,805,061 | 4/1974 | De Missimy et al. . |
| 3,805,085 | 4/1974 | Andrews ............................ 361/189 |
| 3,842,260 | 10/1974 | Christensen et al. ............... 250/221 |
| 3,895,269 | 7/1975 | Geremia ............................. 361/189 |
| 3,914,621 | 10/1975 | Passarelli, Jr. .................... 361/189 |
| 4,015,122 | 3/1977 | Rubinstein . |
| 4,074,602 | 2/1978 | Brower ............................... 361/189 |
| 4,185,192 | 1/1980 | Wagner . |
| 4,227,547 | 10/1980 | Cameron . |
| 4,239,961 | 12/1980 | Lasar . |
| 4,249,074 | 2/1981 | Zettler et al. . |
| 4,358,651 | 11/1982 | Hostetler et al. . |
| 4,388,528 | 6/1983 | Walter ................................ 250/221 |
| 4,412,268 | 10/1983 | Dassow .............................. 361/189 |
| 4,479,053 | 10/1984 | Johnston . |
| 4,520,262 | 5/1985 | Denton .............................. 340/556 |
| 4,563,578 | 1/1986 | Nagai et al. . |
| 4,939,358 | 7/1990 | Herman et al. .................... 250/221 |
| 5,077,467 | 12/1991 | Barron, Jr. et al. . |
| 5,367,158 | 11/1994 | Herman et al. .................... 250/221 |

*Primary Examiner*—Stephone Allen
*Attorney, Agent, or Firm*—Gifford, Krass, Groh, Sprinkle, Patmore, Anderson & Citkowski, P.C.

[57] ABSTRACT

A photoelectric switch having a rectifier for converting a received AC voltage to a DC voltage, a transparent cover having a user friendly finger rest surface, means for generating a pulsed infrared beam across the finger rest surface, means responsive to the breaking of the pulsed infrared beam by an operator placing at least one finger on the finger rest surface to actuate a relay to generate an output signal, and means for disabling the actuation of the relay in response to the operator removing his finger from the finger rest surface restoring the continuity of the pulsed infrared beam. The photoelectric switch includes fault protection circuits which disable the relay when the AC voltage is below a predetermined voltage, when the ambient infrared background illumination exceeds a predetermined value, or when the means for generating a pulsed infrared beam fails to generate the beam. The photoelectric switch also includes circuits for lighting a fault light when the AC voltage is less than the predetermined voltage, the ambient infrared background illumination exceeds the predetermined limits, and when a contact in the relay welds or becomes stuck in the activated position.

23 Claims, 3 Drawing Sheets

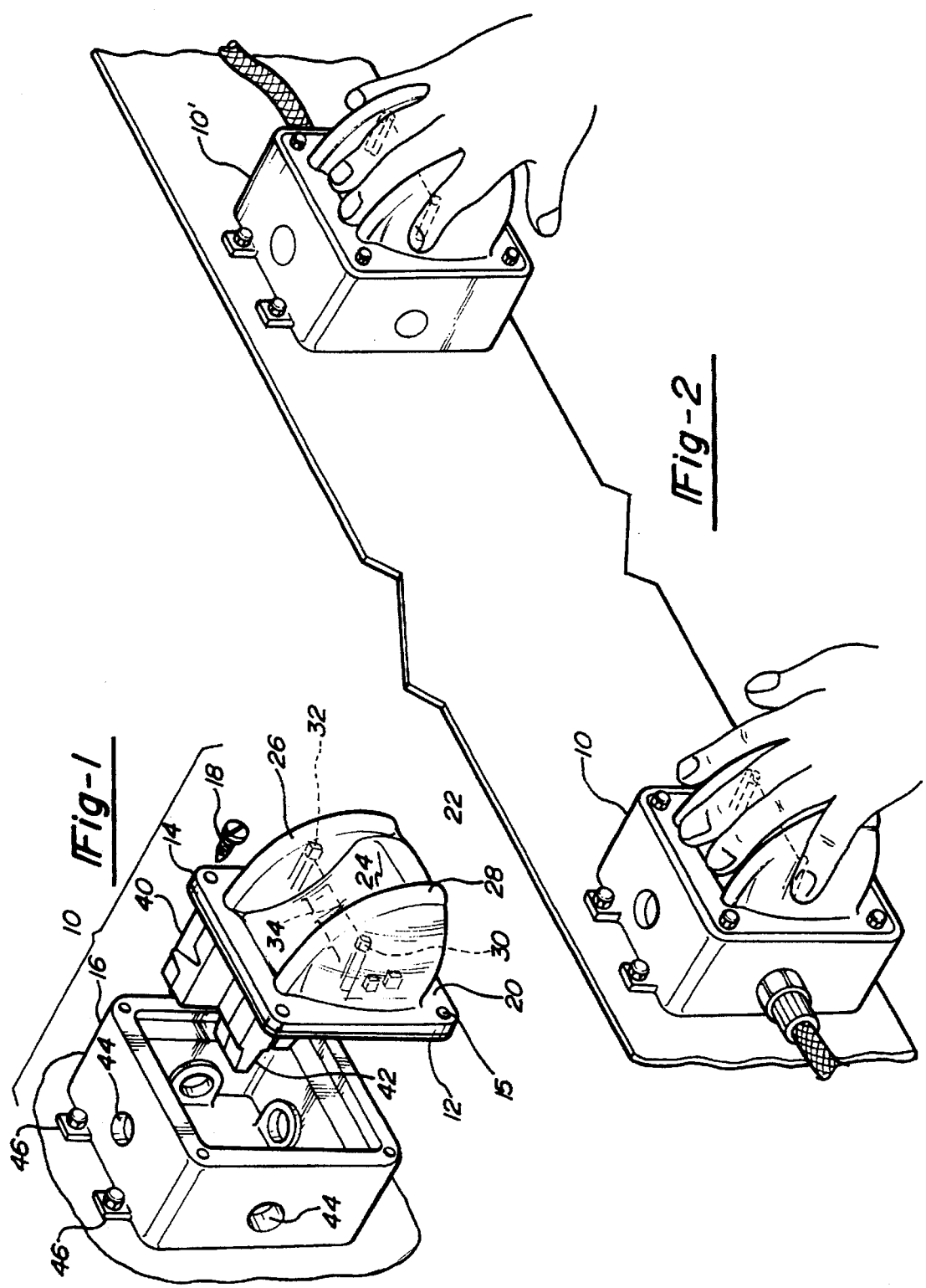

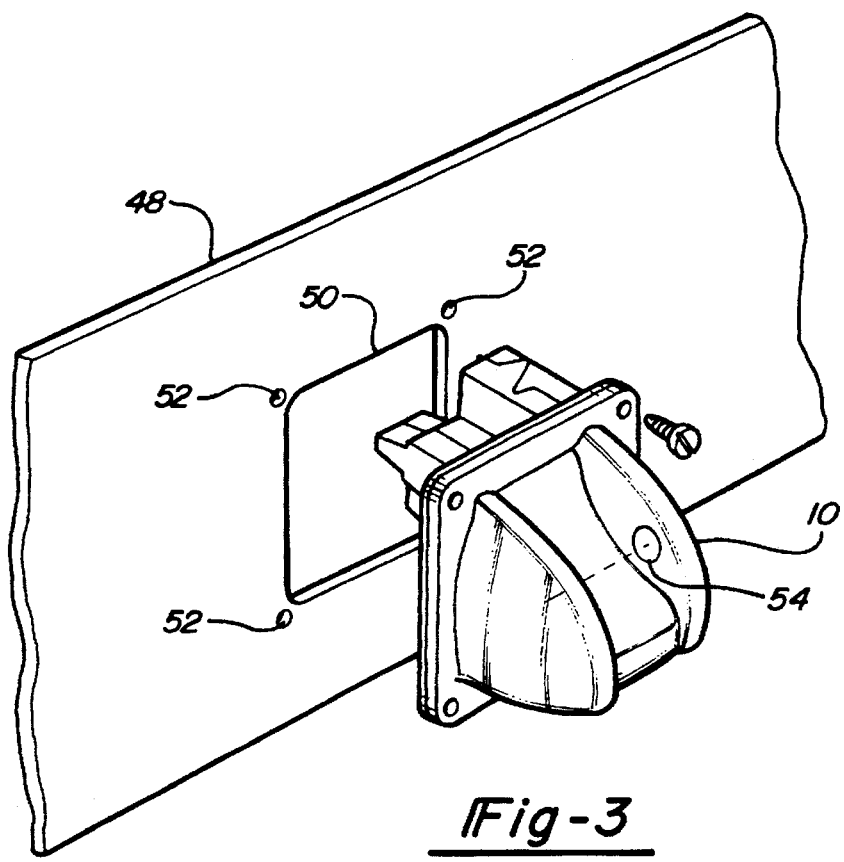
Fig-3
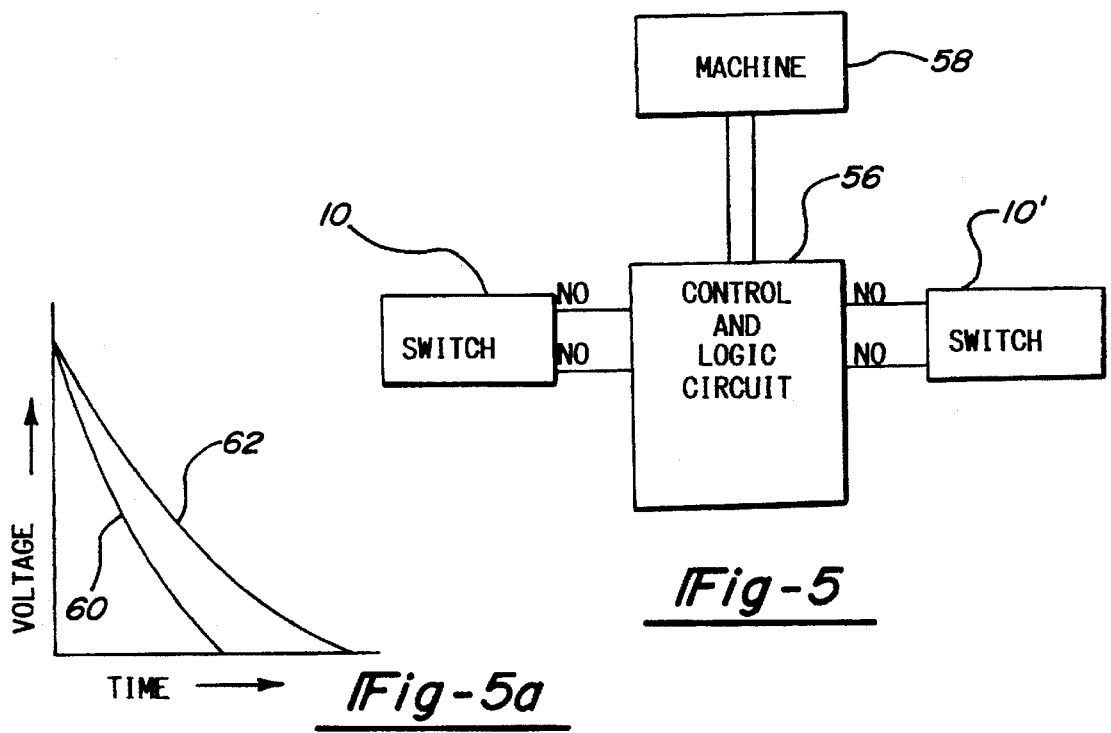
Fig-5
Fig-5a

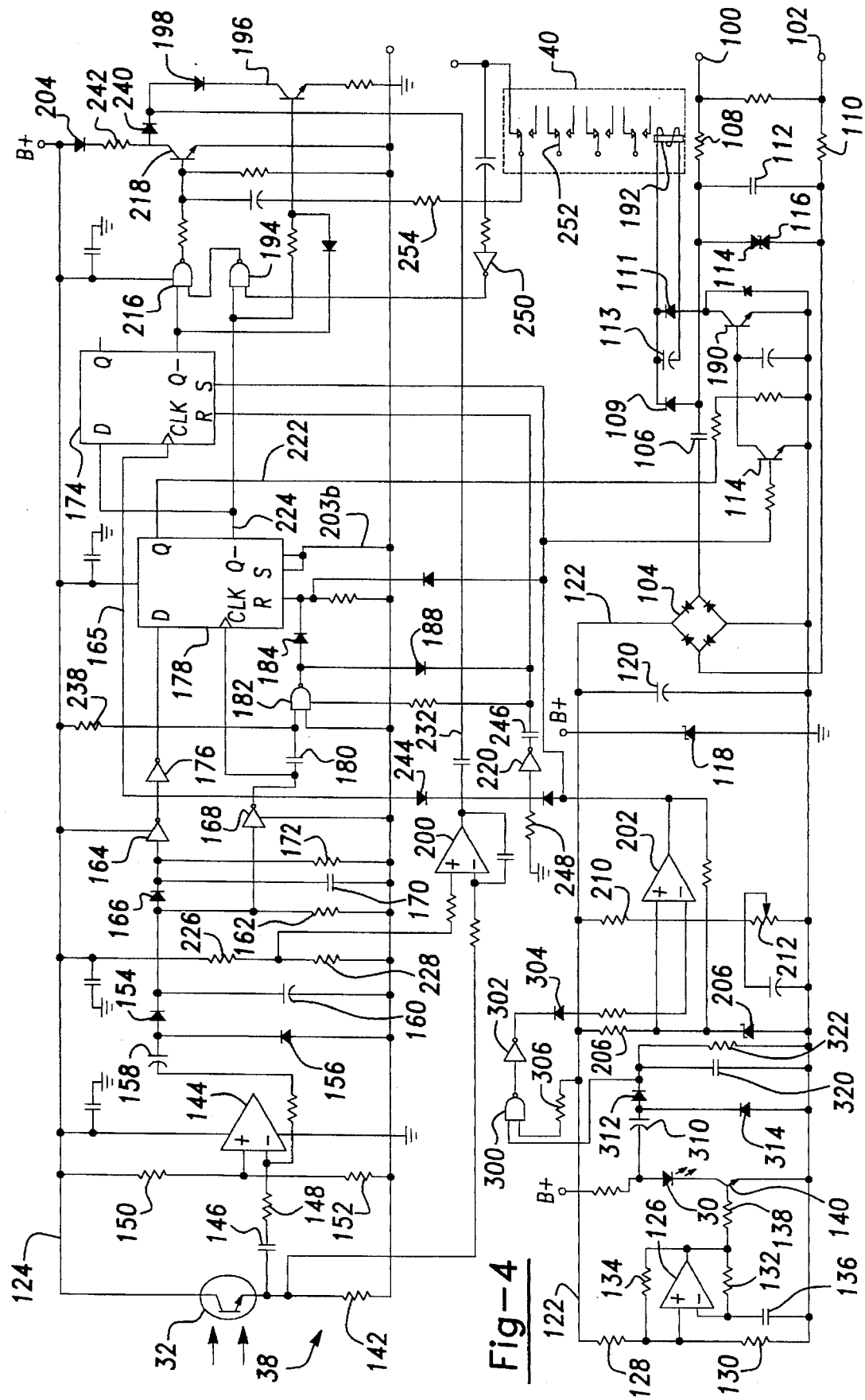

PHOTOELECTRIC SWITCH FOR USE WITH A MACHINE CONTROL CIRCUIT

This is a continuation-in-part application of U.S. Ser. No. 07/782,420, filed Oct. 25, 1991 now U.S. Pat. No. 5,367,158.

BACKGROUND OF THE INVENTION

I. Field of the Invention

The invention is related to electrical switches and in particular to a photoelectric switch for initiating or changing a mode of operation of a machine in a user safe manner.

II. Description of the Prior Art

It has long been known to use a pair of spatially separated manually operable switches to activate the operational modes of machines such as stamping presses, riveters, tube benders, spot welders or like machines. The purpose of the spatially separated manually operated switches is to ensure that both of the operator's hands are positioned away from the machine prior to its operation. To further ensure the safety of the operator, the pair of switches must be activated simultaneously and must be placed apart a distance sufficient to prevent simultaneous operation of both switches by a single hand. The Federal Occupational Safety and Health Administration (OSHA) has set the criteria that must be met by such machine operating equipment to ensure adequate operator safety.

The prior art initially used a mechanically actuated single pole double throw palm button switch. These palm button switches are biased to a normally open position and constant depression is required to close the normally open contact. The use of a pair of spatially separated palm buttons has been adequate for the intended safety purposes. However, because the operator must apply significant pressure to the palm button switches in order to achieve actuation, the operators are experiencing inflammation of the tendons due to the repetitive and forceful action of the fingers and wrists. This inflammation of the tendons of the fingers and wrists is known as Carpal Tunnel Syndrome. This ailment has increased worker fatigue and complaints, has decreased productivity and has increased the frequency of disability claims under worker's compensation laws and programs.

The problems associated with the palm button switch has been substantially eliminated by the photoelectric switch taught by Herman et al. in U.S. Pat. No. 4,939,358. This switch apparatus employs an infrared light source and a photodiode placed on opposite sides of a slot designed to received one or more fingers of the operator. The fingers of the operator, when in the slot, occlude or break the infrared light path between the light source and the photodiode. The photodiode, in response to breaking or occlusion of the infrared beam, actuates a relay to switch its pole from a normally closed contact to a normally open contact. Conversely, when the infrared beam is restored, the relay is deactivated and the pole of the relay returns to the normally closed contact. Although the photoelectric switch taught by Herman et al. resolved most of the problems associated with palm button switches, the insertion of the fingers into the slot has been found to be uncomfortable for the operator and sides of the fingers became sore when they were repeatedly banged against the bottom of the slot.

The invention is an improved photoelectric switch which is user friendly and incorporates a plurality of safety features not normally provided by the prior art switches.

SUMMARY OF THE PRESENT INVENTION

The invention is a photoelectric switch for use in conjunction with a machine control circuit which controls the operation of a machine capable of performing a machining operation. The machine control circuit is responsive to inputs received from a pair of photoelectric switches to activate the machine. The machine control circuit prevents the machine from performing its machining operation unless the machine control circuit receives input signals from both of the photoelectric switches within a predetermined period of time. The machine is actuated by an AC electrical power source providing an AC voltage within a predetermined AC voltage range. Each photoelectric switch comprises a cover having a contoured finger rest surface, means for generating a light beam above the finger rest surface, which is occluded by an operator placing at least one finger on the finger rest surface of the cover, and a relay having an activated state in which it generates the input signal to the machine control circuit. Each photoelectric switch also has means for activating the relay in response to the beam being occluded by at least one finger of the operator placed on the finger rest surface of the cover and means for deactivating the relay in response to the termination of the beam from being occluded.

The preferred embodiment of the photoelectric switch includes a low voltage protection circuit which prevents the activation of the relay when the AC voltage being applied to the machine is less than a predetermined voltage, a high ambient light protection circuit for preventing the actuation of the relay when the ambient light level is excessive, and means for energizing a fault light when one or more of the relay contacts are stuck or welded in an energized position.

Also provided is a light emitting failure circuit for preventing actuation of the relay when the means for generating a light beam fails to generate any light.

The primary object of the invention is a user friendly photoelectric switch which incorporates at least one or more fault detection circuits.

Another object of the invention is a contoured cover having a user friendly finger rest surface. The photoelectric switch produces an output signal when the operator places one or more fingers on the finger rest surface.

Another object of the invention is a pair of raised finger guides formed on opposite sides of the finger rest surface to guide the placement of the operator's fingers on the finger rest surface.

Another object of the invention is to generate a pulsed infrared light beam above the finger rest surface which is broken or occluded when the operator places at least one finger on the finger rest surface.

Another object of the photoelectric switch is that the cover is made from a transparent plastic material.

Another object of the invention is that the cover is dyed or colored red for high visibility in the work place.

Another object of the photoelectric switch is that an infrared light emitting diode is disposed in a raised finger guide on one side of the finger rest surface and a phototransistor is disposed in the raised finger guide on the opposite side of the finger rest surface to detect the placement of at least one finger on the finger rest surface of the cover.

Another object of the photoelectric switch is to use a relay to generate an output signal which is immune to noise and line transients.

Still another object of the photoelectric switch is to prevent the actuation of the relay when the AC voltage is less than a predetermined voltage to prevent actuation of the machine when the AC voltage is below its minimum operating voltage.

Yet another object of the invention is a photoelectric switch having a high ambient light protection circuit to prevent erratic or unreliable activation of the photoelectric switch under high ambient infrared light conditions.

Yet another object of the invention is to prevent actuation of the relay when the infrared light emitting diode fails to emit any light.

Still another object of the invention is a photoelectric switch having a stuck or welded contact protection circuit which energizes a fault light when the contacts of the relay are stuck or welded in the activated state.

Still another object of the invention is an anti-tease circuit arrangement which prevents the actuation of the switch when the time required to break the light beam exceeds a predetermined period of time.

These and other objects of the invention will become apparent from a reading of the specifications in conjunction with the drawings.

BRIEF DESCRIPTION OF THE DRAWINGS

A better understanding of the present invention will be achieved upon reference to the following detailed description, when read in conjunction with the accompanying drawings, wherein like reference characters refer to like parts and in which:

FIG. 1 is an exploded view of the photoelectric switch;

FIG. 2 shows two photoelectric switches mounted on a switch panel and the placement of the fingers on the finger rest surfaces to activate the photoelectric switches;

FIG. 3 shows an alternate mounting arrangement of the photoelectric switch to a switch panel;

FIG. 4 is the circuit diagram of the circuit contained on the circuit board;

FIG. 5 is a block diagram showing the relationship of the photoelectric switches to the control and logic circuit of a machine; and FIG. 5a is a graph showing the decay curves of the two RC circuits used to actuate the relay flip-flop.

DETAILED DESCRIPTION OF THE INVENTION AND PREFERRED EMBODIMENT THEREOF

FIG. 1 is an exploded view of the improved photoelectric switch 10. The photoelectric switch 10 has an electronic circuit board 12 to which is attached a cover 14. The circuit board 12 and the cover 14 are cemented to each other and mounted on a housing 16 by means of screw type fasteners 18 passing through holes 15 at the four corners thereof. Alternatively, the circuit board 12 and the transparent cover 14 may be attached directly to a switch panel 48, as shown in FIG. 3. The switch panel 48 has a rectangular aperture 50 into which the photoelectric switch 10 is received and threaded bores 52 for receiving the threaded fasteners 18.

The cover 14 has a flat base 20, which is cemented to the periphery of the circuit board 12, and a protruding finger rest 22. The protruding finger rest has a centrally located finger rest surface 24 contoured to comfortably support at least two fingers of an operator, as shown in FIG. 2. A pair of spatially separated finger guides 26 and 28 are provided on opposite sides of the finger rest surface 24 and provide for positive location of one or more fingers on the finger rest surface 24.

The finger guides 26 and 28 are hollow and respectively contain a light emitting diode 30 and a phototransistor 32 attached to the circuit board 12. The light emitting diode 30 and the phototransistor 32 are disposed in the finger guides 26 and 28 so that the direct light path 34 between these two elements is external to the cover 14 and across the finger rest surface 24.

Preferably, the cover 14 is made from an infrared transparent plastic material so that the light emitted from the light emitting diode 30 is transmitted through the side walls, such as side wall 36 of the finger guides 26 and 28, and is received by the phototransistor 32. Preferably, the transparent plastic material is colored or dyed red for high visibility in an industrial atmosphere.

Alternatively, as shown in FIG. 3, the cover 14 may be made from an opaque material. In addition, infrared transparent windows, such as window 54, are located on the opposing side walls of the finger guides 26 and 28 providing a transparent infrared light path between the light emitting diode 30 and the phototransistor 32.

The circuit board 12 contains an electronic circuit 38, shown in FIG. 4, a multiple contact relay 40, a light emitting diode 30, a phototransistor 32, and an electrical connector 42. The electrical connector 42 permits AC electrical power to be provided to the electronic circuit 38 and permits electrical signals generated by the photoelectric switch to be transmitted to a utilization device such as a machine controller.

The housing 16 has a cavity in which the multiple contact relay 40 and the electrical connector 42 are received and has at least one electrical outlet 44. The housing 16 also has one or more mounting tabs 46 which permit the housing 16 to be mounted at an appropriate location relative to the machine being operated by the switch 10.

When operating machines, such as stamping presses, riveters, tube benders, spot welders, and the like, where the probability exists than an operator's hand may accidentally be injured if not removed from the machine prior to actuation, a pair of photoelectric switches 10 and 10', one for each hand, are normally provided to meet the criteria established by the Federal Occupational Safety and Health Administration. The two photoelectric switches 10 and 10', as shown in FIG. 2, are mounted on a switch panel 48 and are preferably separated from each other by a distance sufficient to prevent both switches from being actuated by the same hand. In general, these switches are placed 12 to 16 inches apart, which is about equal to the shoulder width of an operator. This separation has been found to be comfortable for an operator to activate both switches at the same time.

As shown in FIG. 5, the two photoelectric switches, 10 and 10', are connected to an electrical machine control and logic circuit 56 which controls the operation of a machine 58. The machine control and logic circuit 56 is of a conventional design well known in the art. In the preferred embodiment of the control and logic circuit 56, two control signals are received from each photoelectric switch 10 and 10'. The first control signal is associated with a normally closed (NC) contact of the multiple contact relay 40 and the other control signal is associated with a normally open contact of the multiple contact relay 40. The state of relay 40, in which either the normally open or normally closed contacts are closed, is dependent upon whether the phototransistor 32 is receiving light from the light emitting diode 30 or if the light path between the light emitting diode 30 and the phototransistor is broken or occluded by a finger of the operator being placed on the finger rest surface 24.

When the machine control and logic circuit 56 receives a signal from both photoelectric switches 10 and 10', signifying that the normally closed contacts are closed, it will inhibit the operation of the machine. Conversely, when the control and logic circuit receives a signal signifying that the relay has been activated to close the normally open contacts, it will activate the machine. As shall be explained relative to the circuit shown in FIG. 4, the relay 40 is activated when the light path between the light emitting diode 30 and the phototransistor 32 is broken or blocked by the operator placing at least one finger on the finger rest surface 24.

Since the machine control and logic circuit 56 does not form part of this invention and its operation is well known in the art, it need not be further discussed for a complete understanding of the invention.

The details of the electronic circuit 38 contained on the circuit board 12 are shown in FIG. 4. AC electrical power is received at power input terminals 100 and 102, respectively, as shown on FIG. 4. This AC electrical power has a nominal voltage range from 90 to 140 volts. The AC electrical power is applied to a full wave rectifier 104 through capacitor 106 and inductors 108 and 110, respectively. The inductors 108 and 110, in combination with the capacitor 112 and back-to-back Zener diodes 114 and 116, form a transient suppression filter at the electrical power input end of the circuit. This transient suppression filter slows transient rise time and lowers the amplitude of high frequency noise on the AC power lines. The back-to-back Zener diodes 114 and 116 also limit the maximum AC voltage to approximately 150 volts and further block power line noise and transient voltage spikes from entering the circuit causing false triggering or activation of the relay 40.

The full wave rectifier 104 rectifies the AC electrical power and produces a positive DC voltage output which is used to electrically power the light emitting diode 30, the phototransistor 32, and the remainder of the circuit. A Zener diode 118, as shown on FIG. 4, limits the output voltage of the full wave rectifier 104 to 12 volts DC. The capacitor 120 filters the 12 volt DC output of the full wave rectifier 104.

The filtered 12 volt DC output of the full wave rectifier 104 is applied to B+ lines 122 and 124, as shown.

A 700 hertz oscillator consisting of operational amplifier 126, resistances 128 through 134 and capacitor 136 has its output connected to the base of a transistor 140 through a resistance 138. Transistor 140 is connected in series with the infrared light emitting diode 30 between the B+ line 122 and ground. The output of the infrared light emitting diode 30, will, therefore, be a pulsed light beam having a 40% duty cycle and a 700 hertz frequency.

As previously indicated, the pulsed infrared light beam generated by the infrared light emitting diode 30 is received by the phototransistor 32. The phototransistor 32 is connected in series with resistor 142 between the B+ line 124 and ground. The junction between phototransistor 32 and resistor 142 is connected to the negative input of operational amplifier 144 through capacitor 146 and resistor 148. The positive input to operational amplifier 144 is connected to the junction of resistors 150 and 152 which form a voltage divider between B+ line 124 and ground. The values of resistors 150 and 152 are selected such that operational amplifier 144 produces a pulsed output signal in response to the phototransistor 32 receiving the pulsed light beam from the infrared light emitting diode 30 under normal operating conditions.

The pulsed output of operational amplifier 144 is rectified by the circuit consisting of diodes 154 and 156, capacitors 158 and 160, and resistor 162. The capacitance of capacitor 160 and the resistance of resistor 162 are selected to have a relatively short RC time constant, as shown by curve 60 on FIG. 5a. The potential across capacitor 160 is applied to the input of an inverter 164 by diode 166 and directly to the input of inverter 168. An RC delay circuit consisting of capacitor 170 and resistor 172 having a time constant shown as curve 62 on FIG. 5a which is longer than the time constant of curve 60.

The output of inverter 164 is applied directly to the clock input of a fault flip-flop 174 and to the D input of relay flip-flop 178 through inverter 176. The output of inverter 168 is applied directly to the clock input of relay flip-flop 178 and to one input of NAND gate 182 through capacitor 180. The output of NAND gate 182 is connected to the RESET input of relay flip-flop 178 through diode 184. The RESET input of relay flip-flop 178 is also connected to ground by resistor 186. The output of NAND gate 182 is also connected to the RESET input of fault flip-flop 174 through diode 188 via line 118.

The Q output of relay flip-flop 178 is connected to the base of a transistor 190 connected in series with the coil 192 of relay 40 between the AC input line and ground. The $\overline{Q}$ output of relay flip-flop 178 is connected to the D input of fault flip-flop 174, to an input to NAND gate 194 and to the base of transistor 196. Transistor 196 is connected in series with a pilot light, such as light emitting diode 198 between the Q output of fault flip-flop 174 and the output of a comparator 200, via line 201. Under no-fault conditions, the Q output of fault flip-flop 174 is a ground potential and the output of comparator 200 is a positive potential.

The operation of the circuit under no-fault conditions is as follows: prior to interrupting the beam, relay flip-flop 178 is in its RESET state with the Q output being a ground potential and its $\overline{Q}$ output being at a positive potential. When the Q output of the relay flip-flop 178 is a ground potential, transistor 190 is non-conductive and the coil 192 of the relay 40 is de-energized. The position of the poles of relay 40 are as shown in FIG. 4. The positive $\overline{Q}$ output of relay flip-flop 178 will place transistor 196 in a conductive state energizing pilot light emitting diode 198 indicating that the relay 40 is de-energized. The fault flip-flop 174 is also in its reset state in which its Q output is at a ground potential and its $\overline{Q}$ output is a positive potential.

When the infrared beam is not broken, the phototransistor 32 generates a pulsed signal at the input to operational amplifier 144 which generates an amplified pulsed signal. This amplified pulsed signal is rectified by diodes 154 and 156 to produce a positive potential across capacitor 160. The positive potential across capacitor 160 is applied to the D input of relay flip-flop 178 by means of serially connected inverters 164 and 176. A negative clock signal from inverter 168 is applied to the clock input of flip-flop 178. The negative signal applied to the clock input holds flip-flop 178 in its existing reset state with its Q output at a ground potential and its $\overline{Q}$ output at a positive potential.

When the operator places one or more fingers on the finger rest surface 24, of the cover 14, the light beam is broken, terminating the pulsed signal at the input to operational amplifier 144. The potential across capacitor 160 will start to decay at a rate faster than the potential across capacitor 170. The flip-flop 178 will respond to the leading edge of the positive signal output by inverter 168 and clock flip-flop 178 while the signal across capacitor 170 is still positive. This will cause relay flip-flop 178 to change state and its $\overline{Q}$ output will assume a positive potential while its Q output will assume a ground potential. The positive potential at the Q output of relay flip-flop 178 will place transistor 190 in a conductive state. The coil 192 of relay 40 will now be energized by the current from the AC input terminal 100 through inductance 108, diode 109 and transistor 190. The poles in the relay 40 will change state. Also the $\overline{Q}$ output of relay flip-flop 178 will place a ground potential at the base of transistor 196 de-energizing pilot light emitting diode 198, indicating the relay 40 has been actuated.

When the operator removes his finger from between the infrared light emitting diode 30 and the phototransistor 32, a pulsating signal will again be applied to the negative input of operational amplifier 144 which will produce an amplified pulsating output. This pulsating output will be rectified by diode 154 and 156 placing a positive potential at the inputs of inverters 164 and 168. Inverter 168 will produce a negative output signal which is applied to an input of NAND gate 182 through a capacitor 180. The output of NAND gate 182 will become a positive potential in response to the negative potential applied to its input which is applied to the RESET input of relay flip-flop 178. The positive potential applied to the RESET input will reset relay flip-flop 178, returning its Q output to a ground potential and its $\overline{Q}$ output to a positive potential.

The ground potential at the Q output of relay flip-flop 178 is applied to the base of transistor 190 rendering it nonconductive, and thereby, deactivating relay coil 192 of relay 40. This returns the switch to its nonactivated state which returns the contacts of relay 40 to their unactivated positions (i.e., the normally closed contacts will close and the normally open contacts will open). The positive potential at the $\overline{Q}$ output of relay flip-flop 178 places transistor 196 in the conductive state energizing pilot light emitting diode 198 which produces a visual signal indicating that the relay 40 is deactivated.

Diode 111 and capacitor 113 connected in parallel with relay coil 192 are provided to suppress the inductive flyback potential generated when the relay coil 192 is de-energized.

The photoelectric switch 10 has several fault protection circuits which enhance the safety and reliability of the photoelectric switch. The fault protection circuits are for the following conditions:

1) when the AC voltage is below the minimum operating voltage of the device being controlled;

2) when there is excessive ambient infrared light present which would adversely effect the operation of the switch;

3) when one or more contacts in the relay 40 are welded or become stuck in the activated position;

4) when the infrared light beam is blocked or otherwise occluded by dirt in the side walls of the finger guides;

5) upon initial power up, if the beam is not broken the relay will not energize; and 6) when the light emitting diode fails to emit any light.

A comparator 202 is used to generate a fault signal when the AC voltage is below the minimum operating potential of the device being controlled. This fault signal will disable relay 40 and energize a fault light emitting diode 204, as shall be explained.

Comparator 202 has its positive input connected to the 12 volt B+ line 122 by a resistor 206 and to ground by Zener diode 208. The Zener diode 208 maintains the potential at the positive input of comparator 202 at a predetermined reference voltage of approximately 5.1 volts. The negative input to comparator 202 is a connected junction between fixed resistor 210 and variable resistor 212 which form a voltage divider between the B+ line 122 and ground. Variable resistor 212 is adjusted so that the output of comparator 202 on line 203 is a positive potential when the AC voltage across input terminals 100 and 102 is below the minimum operating voltage of the device being controlled.

The positive potential output of comparator 202 resets relay flip-flop 178, through diode 213, so that its Q output becomes a ground potential and its $\overline{Q}$ output becomes a positive potential. The positive potential at the output of comparator 202 on line 203a also places transistor 213, FIG. 4, in the conductive state which places the base of transistor 190 at a ground potential rendering transistor 190 nonconductive and de-energizing relay 40. Therefore, during the initial application of electrical power to the electronic circuit, transistor 190 remains nonconductive preventing accidental activation of the relay 40. Further, the positive potential at the output of comparator 202 on line 203b sets fault flip-flop 174 causing the Q output to become a positive potential and its $\overline{Q}$ output to become a ground potential. When the Q output of fault flip-flop 178 becomes a positive potential, transistor 196 becomes nonconductive and de-energizes pilot light emitting diode 198. The ground potential at the $\overline{Q}$ output of fault flip-flop 174 applied to an input of NAND gate 216 causes its output to become a positive potential, placing transistor 218 in a conductive state. This energizes a fault light, such as light emitting diode 204, signifying a fault has been detected.

The low voltage fault detection circuit will also momentarily turn on the fault light emitting diode 204 each time power is first applied to the photoelectric switch 10. However, after the AC voltage exceeds the minimum operating voltage of the device being controlled, the output of comparator 202 will become a ground potential which terminates the positive potential applied to the input of inverter 220 and its input will now, via resistor 248, become a ground potential. Inverter 220, in response to its input being at a ground potential, will generate a positive potential at its output which is applied to the RESET input of fault flip-flop 174 via line 221. The Q output of fault flip-flop 174 will now become a ground potential and its $\overline{Q}$ output becomes a positive potential.

As previously discussed, when the output of comparator 202 is a positive potential, relay flip-flop 178 is reset so that its $\overline{Q}$ output is a positive potential which is applied to the base of transistor 196 causing it to become conductive. The emitter of transistor 196 is connected to the Q output of fault relay which is at a ground potential. This causes transistor 196 to become conductive, energizing pilot light emitting diode 198. Simultaneously, the output of NAND gate 194 is a positive potential in response to the ground potential generated at the output of inverter 250. The input to inverter 250 is connected to B+ line through a normally closed contact 252 of relay 40. The input to inverter 250 is also connected to ground through resistor 254.

The other input to NAND gate 216 is connected to the $\overline{Q}$ output of fault flip-flop 174 which also is a positive potential. With both inputs to NAND gate 216 being positive, its output will be a ground potential, rendering transistor 218 nonconductive and de-energizing fault light emitting diode 204. This places the circuit in its normal mode of operation prior to breaking the infrared light beam between the infrared light emitting diode 30 and phototransistor 32.

In the event of a high ambient infrared illumination being present, which would prevent normal operation or unreliable operation of the circuit, circuit 38 includes a high ambient infrared fault detection circuit responsive to the high ambient infrared illumination to disable relay 40 and to actuate the fault light emitting diode 204. This fault detection circuit consists of comparator 200 which has its positive input connected to a voltage divider consisting of resistors 226 and 228 connected between B+ line 124 and ground. The negative input to comparator 200 is connected to the junction between phototransistor 32 and resistor 142. Under normal operating conditions, the peak or maximum potential at the junction between phototransistor 32 and resistor 142 is less than the potential at the positive input to comparator 200 so that the output of comparator 200 is a continuous positive potential. This positive potential at the output of comparator 200 is applied to one input to NAND gate 230 and to the anode of pilot light emitting diode 198, as shown in FIG. 4, via line 232, as previously described. The other input to NAND gate 230 is connected to B+ line 124 through resistor 234. When the output of comparator 200 is a positive potential, NAND gate 230 will produce a ground potential at its output which is inverted to a positive potential by inverter 236. This positive potential at the output of inverter 236 is applied to one input of NAND gate 182. The other input to NAND gate 182 is connected to the B+ line 124 through resistor 238 and to the output of inverter 168 through capacitor 180.

When the ambient infrared illumination exceeds a predetermined level, the potential at the junction between the phototransistor 32 and resistor 142 becomes greater than the potential at the positive input to comparator 200 causing its output to become a ground potential. This ground potential de-energizes pilot light emitting diode 198 and causes the output of NAND gate 230 to become a positive potential which is inverted to a ground potential by inverter 236. The output of NAND gate 182 will now become a positive potential which resets relay flip-flop 178 deactivating the relay 40, as previously described. Because the output of comparator 200 on line 232 is a ground potential, the fault light emitting diode 204 will be activated by diode 240 having its anode connected to fault light emitting diode 198 through resistor 242 and its cathode connected to the ground potential at the output of comparator 200 by means of line 232.

When one or more of the contacts in relay 40 becomes welded or stuck in the activated position, normally closed contact 252 of relay 40 connected to the input of inverter 250 will be stuck in a normally open state, terminating the positive potential at the input to inverter 250. The input to inverter 250 will now become a ground potential and its output will become a positive potential. This positive potential causes the output of NAND gate 194 to become a negative potential which in turn causes the output of NAND gate 216 to become positive. The positive output of NAND gate 216 causes transistor 218 to become conductive, energizing fault light emitting diode 204.

When the windows between the light emitting diode 30 and the phototransistor 32 are dirty or the light beam is otherwise continuously occluded, the potential across capacitor 160, FIG. 4, will be a ground or near ground potential. This places a ground potential at the input of inverter 164 and a positive potential at the input of inverter 176 which produces a ground potential at the D input of relay flip-flop 178. The ground potential across capacitor 160 will cause inverter 168 to produce a positive clock pulse which will clock relay flip-flop 178 to have a ground potential at its Q output, deactivating relay 40, as previously described, and to have a positive potential at its $\overline{Q}$ output which is applied to the D input of fault flip-flop 174. The clock input from the output of inverter 164, via line 165, will clock the fault flip-flop 174 to its set state with its Q output assuming a positive potential and its $\overline{Q}$ output assuming a ground potential. As previously described, when the Q output of fault flip-flop 174 is a positive potential, pilot light emitting diode 198 is de-energized, and when the $\overline{Q}$ output of flip-flop 174 is a ground signal, fault light emitting diode 204 is energized. Also, the positive output of inverter 164 is applied to the input of inverter 220, via diode 244, causing its output to become a ground signal. This ground signal is applied to the REST input of fault flip-flop 174, via capacitor 246 and line 221, to assure fault flip-flop 174 will be clocked by the leading edge of the clock pulse received from the output of inverter 164.

The different time constants of the RC circuits connected to the D input of relay flip-flop 178, in particular, the first RC circuit comprising capacitor 160 and resistance 162 and the second RC circuit comprising capacitor 170 and resistance 172, also constitutes an anti-teasing circuit which prohibits the operator from trying to produce an abnormal mode of operation of the photoelectric switch 10. The photoelectric switch 10 is intended for applications in which the infrared light beam is completely broken, in less than 20 milliseconds, by placing one or more fingers on the finger rest surface 24 between the finger guides 26 and 28. The operator may try to tease the photoelectric switch 10 by slowly edging his finger along the finger rest surface to slowly reduce the intensity of the infrared light beam from its maximum value to zero. To prevent abnormal operation of the light switch, the decay rate of the first RC circuit is selected to be significantly shorter than the decay rate of the second RC circuit, as shown in FIG. 5a, so that the clock pulse generated by the first RC circuit will occur at least 20 milliseconds before the potential generated by the second RC circuit decays to a value less than that required to toggle the relay flip-flop 178 to change state in response to the clock signal. If the intensity of the light signal received by the photo diode is slowly decreased at rate equal to or less than the decay rate of the second RC circuit, then both RC circuits will decay at approximately the same rate and the clock signal will be generated when the potential at the D input of relay flip-flop 178 is below the potential required to cause relay flip-flop 178 to change state in response to the clock signal. Therefore, when the infrared light beam is slowly broken, i.e, teased, the relay flip-flop will not change state and the relay 40 will not be energized.

In the event that the light emitting diode 30 fails to emit any light, phototransistor 32 would normally sense a broken or blocked condition and cause actuation of the relay 40, therefore resulting in the machine running without direction from the operator. The light emitting diode could fail to emit light under circumstances such as the following: the light emitting diode is malfunctioning or burned out such as when a lead is broken; the transistor 140 is short circuited or open circuited; or if the oscillator including operational amplifier 126 and related components is not oscillating. To prevent the relay from actuating under the above conditions, a light emitting failure circuit is provided that is responsive to the light emitted from the light emitting diode 30.

The light emitting failure circuit includes capacitor 320 connected in parallel with resistor 322. Both are connected to ground on one end and on the other end are connected to the light emitting diode 30 through the connection with diode 312 and capacitor 310. Diode 314 extends from the juncture of the connection of between capacitor 310 and diode 312 to the ground. Capacitor 320 and resistor 322 are also connected to one input of NAND gate 300. Resistor 306 is connected between the other input of NAND gate 300 and line 122. The output of NAND gate 300 is coupled to the inverter 302 which is in turn coupled to the negative input of comparator 202 through diode 304 and resistor 210.

Should the light emitting failure circuit determine that the light emitting diode 30 is not emitting any light, the circuit would generate a signal to the negative input of comparator 202 that would ultimately cause the relay to be disabled, thereby preventing the machine from operating. Essentially, when the light emitting diode 30 fails to emit light, no AC signal is available to rectify and charge capacitor 320. Since capacitor 320 is not charged, resistor 322, which is itself connected to ground, pulls one input of NAND gate 300 to a low potential. The output of NAND gate 300 is consequently pulled to a high potential. Since the output of NAND gate 300 is connected to the input of inverter 302, the output of inverter 302 is pulled to a low potential, almost to ground. Diode 304 will then conduct current from the junction of resistor 212, resistor 210 and the negative input of comparator 202. With the negative input of comparator 202 pulled to a low potential, the output of comparator 202 switches to a high potential. The high potential output signal is connected directly to transistor 214, causing the transistor 214 to turn on. With transistor 214 on, current is pulled from the base of transistor 190, effectively shutting off transistor 190. With transistor 190 off, relay 40 is disabled, and the machine will not run.

In summary, the electronic circuit for the photoelectric switch 10 is a DC relay drive circuit which is easily presettable for a predetermined minimum voltage and easily set to eliminate relay chattering. This circuit is relatively immune from noise and input line transients. The photoelectric switch has at least five fault detection circuits which inhibit the activation of the relay 40 and will energize or light a fault indicator when the input AC voltage is below the minimum operating voltage of the device being controlled, when the ambient light level is above predetermined levels which would interfere with the normal operation of the photoelectric switch, when one or more contacts of the relay become welded or struck in the energized position, when the windows in the line of sight between the infrared light emitting diode become dirty or are continuously occluded, or when the means for generating a pulsed infrared beam fails to generate the beam.

It is not intended that the invention be limited to the exact embodiment shown in the drawings or discussed in the specification. It is acknowledged that those skilled in the art can make certain changes and improvements thereto without departing from the concept of the invention as described above and set forth in the appended claims.

What is claimed is:

1. A photoelectric switch for use in conjunction with a machine for performing a machining operation and a control circuit responsive to a pair of said photoelectric switches generating an input signal to activate said machine, said control circuit preventing said machine from performing said machining operation unless said control circuit receives an input signal from both of said photoelectric switches within a predetermined period of time, said machine being actuated by an AC electrical power source providing an AC voltage within a predetermined AC voltage range, each photoelectric switch of said pair of photoelectric switches comprising:

a cover having a contoured finger rest surface;

means for generating a light beam above said finger rest surface, said light beam being occluded by an operator placing at least one finger on said finger rest surface;

a relay having an activated state in which it generates said input signal;

means for activating said relay to said activated state in response to said beam being occluded by said at least one finger being placed on said finger rest surface;

means for deactivating said relay in response to the termination of said occlusion of said light beam; and light beam failure means, responsive to said means for generating a light beam when said means for generating a light beam fails, to output a signal to said relay inhibiting the activation of said relay;

wherein said light beam failure means comprises a light emitting failure circuit electrically connected to said means for generating a light beam and to said relay.

2. The photoelectric switch of claim 1 wherein said means for generating a light beam comprises:

an infrared light emitting diode; and an oscillator circuit for periodically energizing said infrared light emitting diode to generate a pulsed infrared light beam.

3. The photoelectric switch of claim 2 wherein said means for activating said relay comprises:

photo sensitive circuit means for producing a pulsed output signal in response to said pulsed infrared light beam; and circuit means responsive to the termination of said pulsed output signal to activate said relay.

4. The photoelectric switch of claim 3 wherein said relay has a relay coil, said circuit means comprises:

means for generating a first DC signal in response to said pulsed output signal;

means for generating a second DC signal in response to said first DC signal;

a transistor connected in series with said relay coil; and means responsive to the decay of said first and second DC signals upon the termination of said pulsed signal for activating said transistor to a conductive state energizing said relay coil.

5. The photoelectric switch of claim 4 further comprising:

low voltage protection means responsive to said AC voltage being below a predetermined value to generate a low voltage signal inhibiting the activation of said relay; and high ambient light protection means for inhibiting the activation of said relay in response to high ambient infrared radiation above a predetermined value.

6. The photoelectric switch of claim 5 wherein said high ambient light protection means comprises:

a comparator for generating a first signal in response to said output signal of said photo sensitive circuit having maximum value less than a predetermined value and for generating a second signal in response to said output signal of said photo sensitive circuit having a value greater than said predetermined value; and logic circuit means for inhibiting the activating of said transistor to said conductive state in response to said comparator generating said second signal.

7. The photoelectric switch of claim 6 having a pilot light and a fault light, said photoelectric switch further including means responsive to said means for deactivating said relay to energize said pilot light to signify said relay is deactivated and means responsive to the activation of said relay to de-energize said pilot light.

8. The photoelectric circuit of claim 7 wherein said low voltage protection means includes means for energizing said fault light in response to the generation of said signal inhibiting the activation of said relay.

9. The photoelectric circuit of claim 8 wherein said low voltage protection means includes means for de-energizing said pilot light in response to generating said signal inhibiting the activation of said relay.

10. The photoelectric switch of claim 6 wherein said high ambient light protection means includes means for energizing said fault light in response to said comparator generating said second signal.

11. The photoelectric switch of claim 10 wherein said high ambient light protection means further includes means for de-energizing said pilot light in response to said comparator generating said second signal.

12. The photoelectric switch of claim 7 wherein said relay has at least two sets of contacts, said photoelectric switch having stuck contact detection means responsive to at least one of said two sets of contacts being stuck in an energized position to generate a signal energizing said fault lamp.

13. The photoelectric switch of claim 1 wherein said photoelectric switch is powered by AC electrical power from said AC electrical power source and said means for generating a light beam, said means for energizing the relay and said means for de-energizing said relay require regulated DC electrical power, said photoelectric switch further comprises means for rectifying said AC electrical power to produce said regulated DC electrical power.

14. The photoelectric switch of claim 13 wherein the voltage of said DC electrical power is proportional to the voltage of said AC electrical power, said means for rectifying said AC electrical power includes means for limiting the maximum voltage of said DC electrical power to a predetermined voltage to regulate the voltage of said DC electrical power.

15. The photoelectric switch of claim 13 wherein said low voltage protection means comprises:

means connected to said DC electrical power for generating a reference voltage;

a voltage divider connected to said DC electrical power to generate divided voltage proportional to the voltage of said DC electrical power; and a comparator responsive to said reference voltage and said divided voltage to generate said low voltage signal when said divided voltage is less than said reference voltage.

16. The photoelectric switch of claim 15 wherein said machine has a minimum operating voltage, said reference and divided voltage are selected to cause said comparator to generate said low voltage signal when the voltage of said AC electrical power is less than said minimum operating voltage of said machine.

17. The photoelectric switch of claim 16 wherein said machine has a minimum operating voltage, said voltage divider includes a variable resistor, said variable resistor being adjustable to vary the voltage of said divided voltage so that said comparator will generate said low voltage signal when the voltage of said AC electrical power is less than said minimum operating AC voltage.

18. The photoelectric switch of claim 13 wherein said photoelectric switch includes an input transient suppression filter connected between said AC electrical power and said means for rectifying.

19. A photoelectric switch comprising:

a cover having a contoured finger rest surface;

means for generating a pulsating infrared light beam parallel to said finger rest surface external to said cover, said pulsating infrared light beam being broken by an operator placing at least one finger on said finger rest surface;

a relay having at least one contact for generating an output signal;

means for activating said relay to generate said output signal in response to said infrared light beam being broken by the operator placing at least one finger on said finger rest surface;

means for deactivating said relay to terminate said output signal in response to the termination of said infrared light beam being broken;

high ambient infrared light protection means for inhibiting the activation of said relay in response to the ambient infrared light level exceeding a predetermined value; and light beam failure means, responsive to said means for generating a light beam when said means for generating a light beam fails, to output a signal to said relay inhibiting the activation of said relay.

20. The photoelectric switch of claim 19 wherein said photoelectric switch receives AC electrical power and said means for activating said relay, said means for deactivating said relay and said high ambient infrared light protection means are powered by DC voltage, said photoelectric switch further includes rectifier means for converting said AC electrical power to a DC voltage.

21. The photoelectric switch of claim 20 wherein said DC voltage is proportional to the voltage of said AC electrical power, said photoelectric switch further includes means responsive to said DC voltage for inhibiting the activation of said relay when said DC voltage signifies said AC voltage is less than a predetermined voltage.

22. The photoelectric switch of claim 21 having means responsive to the contacts of said relay being stuck in an activated position for generating a fault signal to activate a fault light.

23. The photoelectric switch of claim 22, wherein said light beam failure means comprises a light emitting failure circuit electrically connected to said means for generating a light beam and to said relay.

* * * * *